(12) United States Patent
Pfister et al.

(10) Patent No.: US 7,144,059 B2
(45) Date of Patent: Dec. 5, 2006

(54) SEPARABLE CONNECTION BETWEEN TWO ADJOINING VEHICLE BODY SKIN PARTS AND METHOD OF MAKING SAME

(75) Inventors: Klaus Pfister, Maulbronn (DE); Dimitar Danev, Renningen (DE)

(73) Assignee: Dr. Ing. h.c.F. Porsche Aktiengesellschaft, Stuttgart (DE)

(*) Notice: Subject to any disclaimer, the term of this patent is extended or adjusted under 35 U.S.C. 154(b) by 114 days.

(21) Appl. No.: 10/939,565

(22) Filed: Sep. 14, 2004

(65) Prior Publication Data

US 2005/0062308 A1 Mar. 24, 2005

(30) Foreign Application Priority Data

Sep. 19, 2003 (DE) ................ 103 43 381

(51) Int. Cl.
*B62D 27/00* (2006.01)

(52) U.S. Cl. ...................................... 296/29
(58) Field of Classification Search ............ 296/29, 296/191, 198; 293/155; 403/116, 113, 157, 403/332, 338; 280/154, 155, 849, 851; 52/716.5–716.7; 16/262, 263; 24/545, 563, 297
See application file for complete search history.

(56) References Cited

U.S. PATENT DOCUMENTS

| 4,215,873 A | * | 8/1980 | Price ........................... 280/848 |
| 4,393,558 A | * | 7/1983 | Herwegh et al. ............ 24/459 |
| D271,079 S | * | 10/1983 | Ward .......................... D8/395 |
| 4,727,629 A | * | 3/1988 | Hoen et al. ................... 24/458 |
| 5,048,868 A | * | 9/1991 | Arenhold .................... 280/848 |
| 5,970,586 A | * | 10/1999 | Demel et al. ................ 24/555 |
| 6,209,940 B1 | * | 4/2001 | Jocher et al. ................ 296/29 |
| 6,598,924 B1 | * | 7/2003 | Palmer et al. ............... 296/29 |
| 6,769,727 B1 | * | 8/2004 | Delavalle et al. ........... 296/29 |
| 6,997,496 B1 | * | 2/2006 | Danev ......................... 296/29 |
| 2003/0126722 A1 | * | 7/2003 | Thompson ................ 24/3.12 |
| 2004/0074048 A1 | | 4/2004 | Danev |
| 2005/0134068 A1 | * | 6/2005 | Pfister et al. ................ 296/29 |
| 2006/0012203 A1 | * | 1/2006 | Andre et al. ................. 296/29 |

FOREIGN PATENT DOCUMENTS

| DE | 1 277 042 | 9/1968 |
| DE | 199 12 267 | 8/1999 |
| DE | 102 42 787 | 4/2004 |

* cited by examiner

Primary Examiner—H Gutman
(74) Attorney, Agent, or Firm—Crowell & Moring LLP

(57) ABSTRACT

A separable connection is provided between two adjoining components, particularly skin parts of a vehicle body. A separable connection ensuring a precise positioning of the two parts as well as a fast and rapid mounting without additional tools is created in that the separable connection is formed by a clamping connection bracing the two flanges with respect to one another, which clamping connection comprises at least one plate-shaped fastening element and a slide-type elastic clamp.

23 Claims, 8 Drawing Sheets

US 7,144,059 B2

SEPARABLE CONNECTION BETWEEN TWO ADJOINING VEHICLE BODY SKIN PARTS AND METHOD OF MAKING SAME

BACKGROUND AND SUMMARY OF THE INVENTION

This application claims the priority of German Application No. 103 43 381.3-12 filed Sep. 9, 2003.

The invention relates to a separable connection between two adjoining components, particularly vehicle body skin parts. Preferred embodiments of the invention relate to a separable connection between two adjoining skin parts of a motor vehicle body, which are fitted to one another along a joint, and in a common connection area, are provided with bent-away, locally adjoining flanges.

In the vehicle construction field, it is generally known to mutually connect adjoining components, particularly skin parts of a vehicle body, by means of welding.

In addition, it is known from German Patent Document DE-PS 1 277 042 to separably connect adjacent skin parts of a vehicle body with one another. For this purpose, a weld nut equipped with an internal thread is provided on a component, into which weld nut a screw can be screwed which is connected with the other component. In order to prevent a twisting of the two components with respect to one another during the fastening, several screwed fastenings have to be provided which are arranged in a mutually spaced manner.

From German Patent Application 102 42 787.9-12 (corresponding U.S. 2004/074048), which has not yet been published, a separable connection is known between two adjoining components, particular motor vehicle body skin parts, which are fitted onto one another along a joint and, in a common connection area, are equipped with bent away, locally adjoining flanges, the two components being mutually connected in the manner of a bayonet catch. For the radial rotation of a sleeve part of the bayonet catch, an auxiliary tool is required in the case of this arrangement.

It is an object of certain preferred embodiments of the invention to further develop a separable connection between two adjoining components, particularly skin parts of a vehicle body such that, on the one hand, a precise positioning of the two parts with respect to one another is achieved while the joint remains uniform and that, on the other hand, a fast and simple mounting of the two components is ensured without additional tools in a not easily accessible area.

According to certain preferred embodiments of the invention, this object is achieved by providing a separable connection between two adjoining skin parts of a motor vehicle body, which are fitted to one another along a joint and, in a common connection area, are provided with bent-away, locally adjoining flanges, wherein the separable connection is formed by a clamping connection bracing the two flanges with respect to one another, which clamping connection comprises at least one plate-shaped fastening element with a slide-type elastic clamp, a head section of the plate-shaped fastening element being supported on one of the two components and the fastening element having at least one holding section which is guided through openings of the two flanges, which fastening element projects over the two flanges, and is provided with detent grooves aligned approximately parallel to the longitudinal course of the flanges, into which detent grooves the elastic clamp is inserted from the side in a slide-in direction.

Additional advantageous features of certain preferred embodiments of the invention are described herein and in the claims.

Advantages achieved by means of certain preferred embodiments of the invention are that, as a result of the separable connection according to the invention, the mounting expenditures, particularly the mounting time, are clearly reduced, and that no additional tool is required. According to certain preferred embodiments of the invention, the clamping connection provided between the two flanges comprises a preassembled plate-shaped fastening element and a slide-type elastic clamp. A head section of the plate-shaped fastening element is supported on one of the two components and has at least one holding section guided through openings of both flanges, which holding section protrudes over the two flanges in the transverse direction and is provided with detent grooves aligned approximately parallel with respect to the longitudinal course of the flanges, into which detent grooves the elastic clamp is inserted from the side in the slide-in direction.

Other objects, advantages and novel features of the present invention will become apparent from the following detailed description of the invention when considered in conjunction with the accompanying drawings.

DETAILED DESCRIPTION OF THE DRAWINGS

Figure 1:
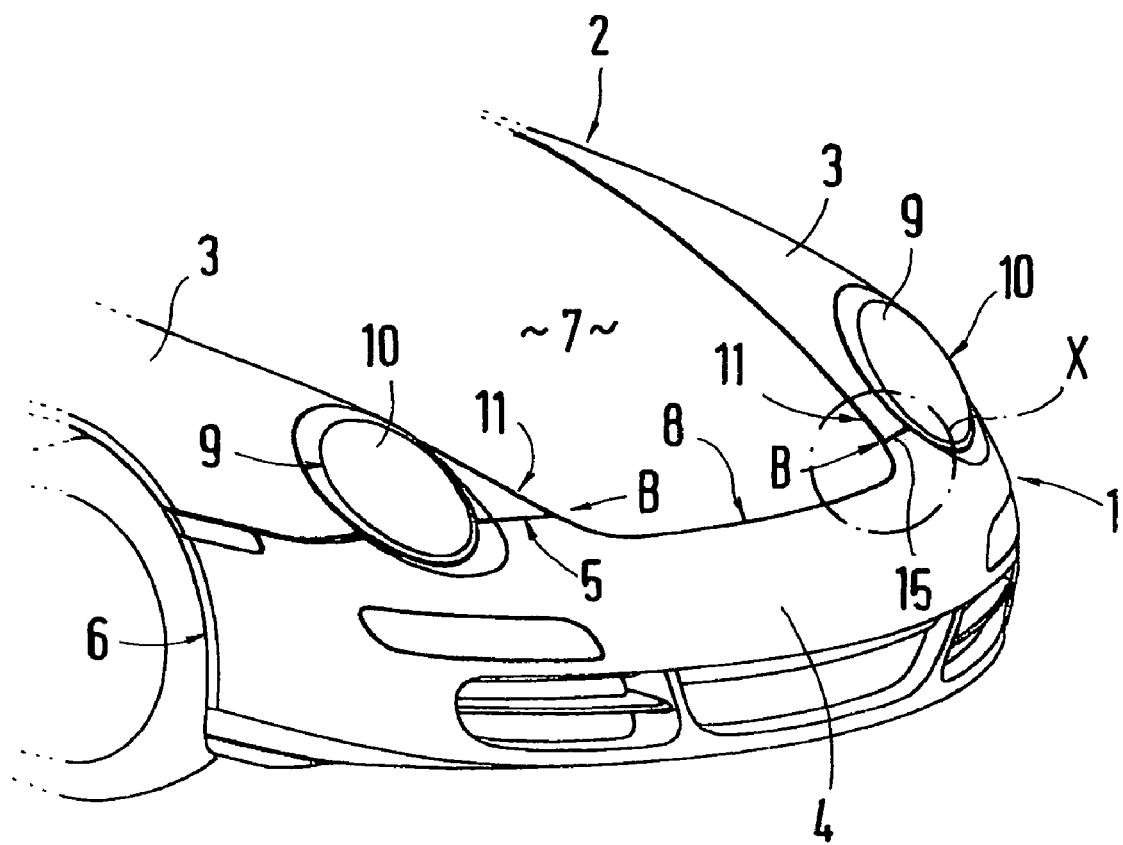
FIG. 1 is a perspective diagonal front view of a forward end area of a passenger car, constructed in accordance with a preferred embodiment of the present invention.
Figure 2:
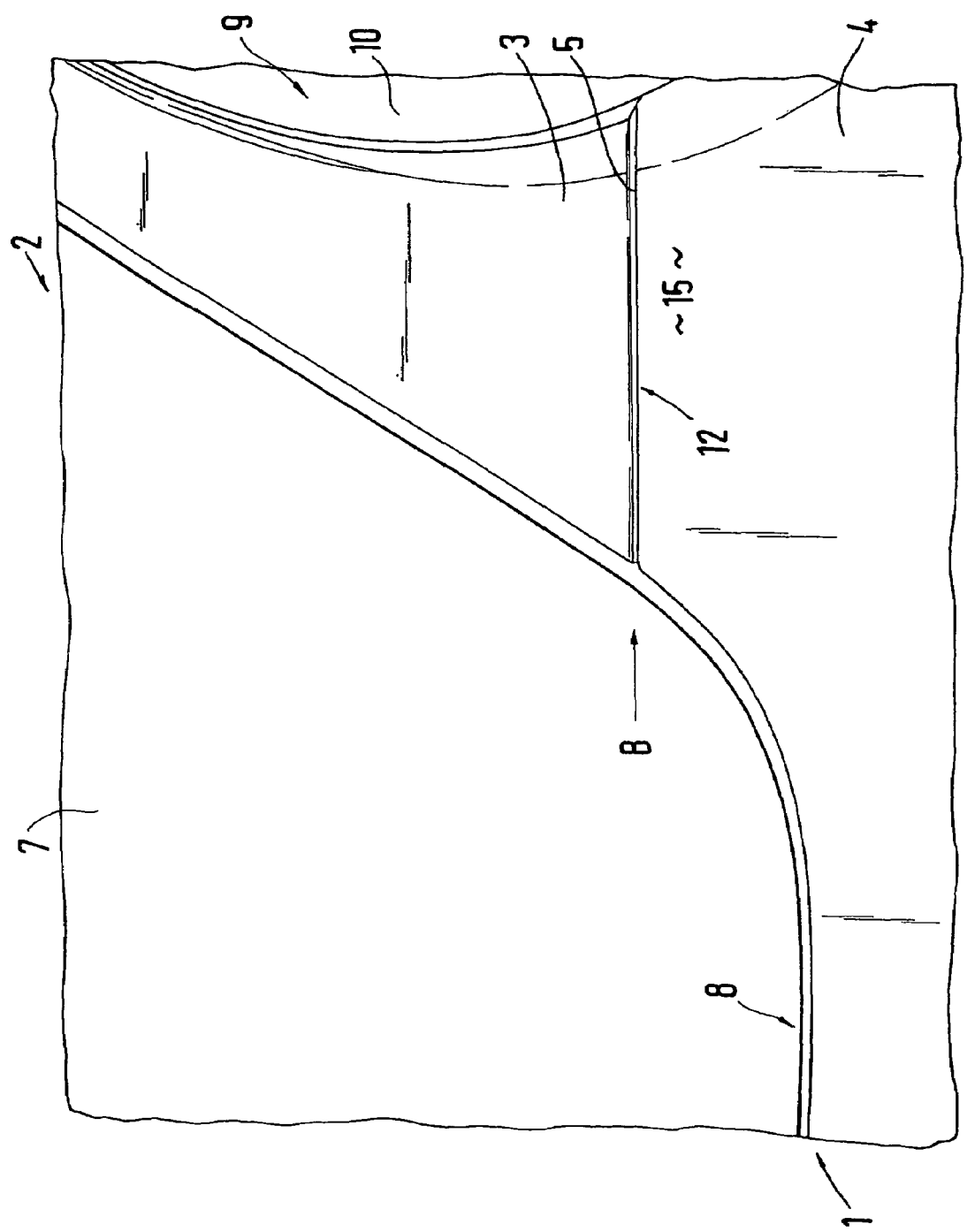
FIG. 2 is an enlarged top view of a detail X of FIG. 1.
Figure 3:
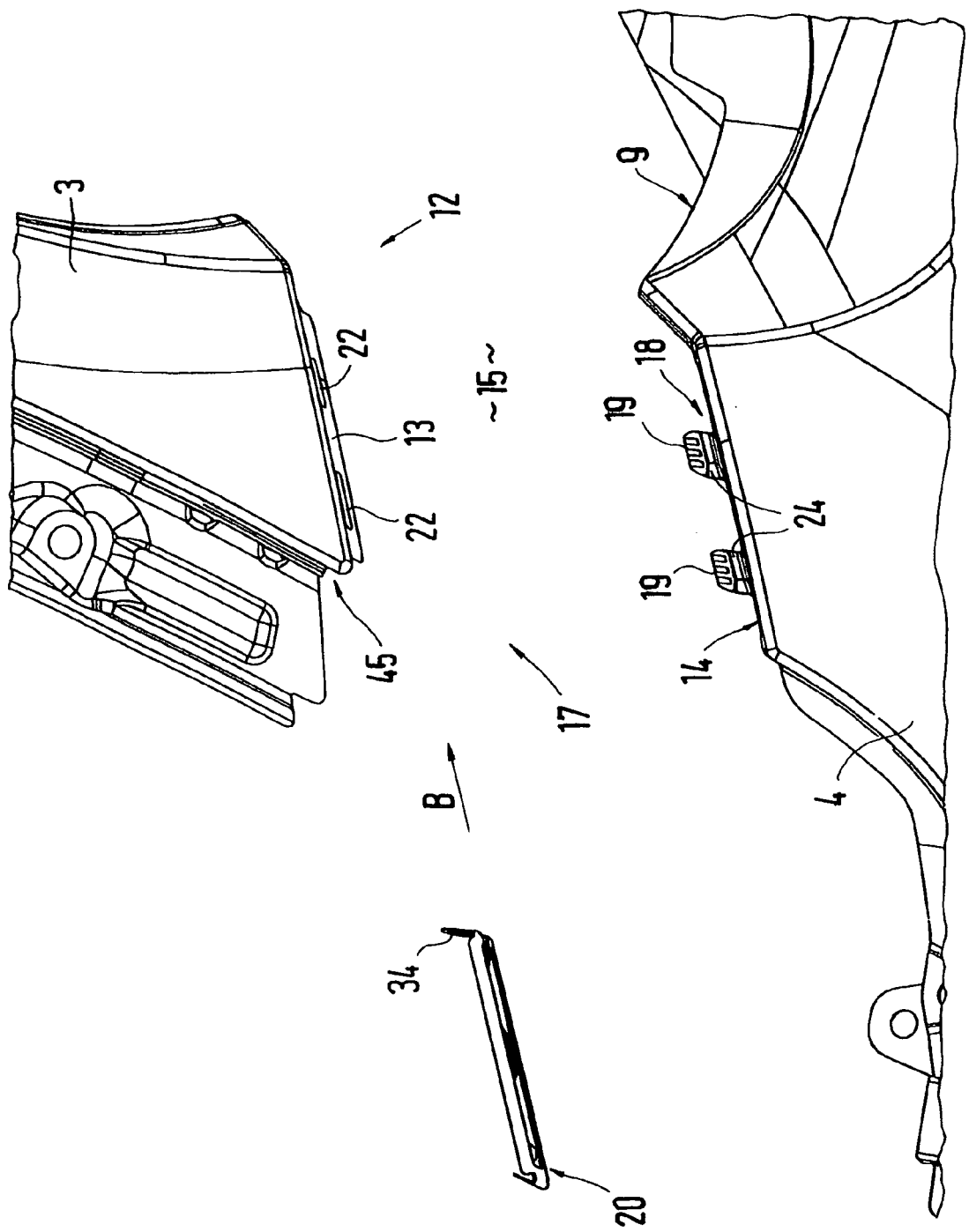
FIG. 3 is an exploded representation of the two skin parts to be connected, viewed from the outside, and a view of the components of the separable connection, constructed according to a preferred embodiment of the present invention.

FIG. 1 illustrates the front-end area 1 of a passenger car 2, where adjoining components 3, 4 of the vehicle body are fitted together along a joint 5. The components 3, 4 are formed by skin parts of the passenger car 2.

In the embodiment shown, the first component 3 is formed by a front fender which is stationary on the vehicle body side; whereas the second component 4 is formed by a transversely extending front-end covering which extends to adjoining wheel houses 6 at both longitudinal sides. The fender is preferably formed by a pressed sheet metal part; whereas the elastic front-end covering is produced of a suitable plastic material.

A forward swivellable flap 7 extends between the two laterally exterior, longitudinally oriented fenders, which flap 7 projects by means of a forward edge area 8, while forming a gap, to the upper edge of the front-end covering. Recesses 9, into which headlights 10 are inserted, are in each case provided at the two fenders and adjoining sections of the front-end covering.

Figure 6:
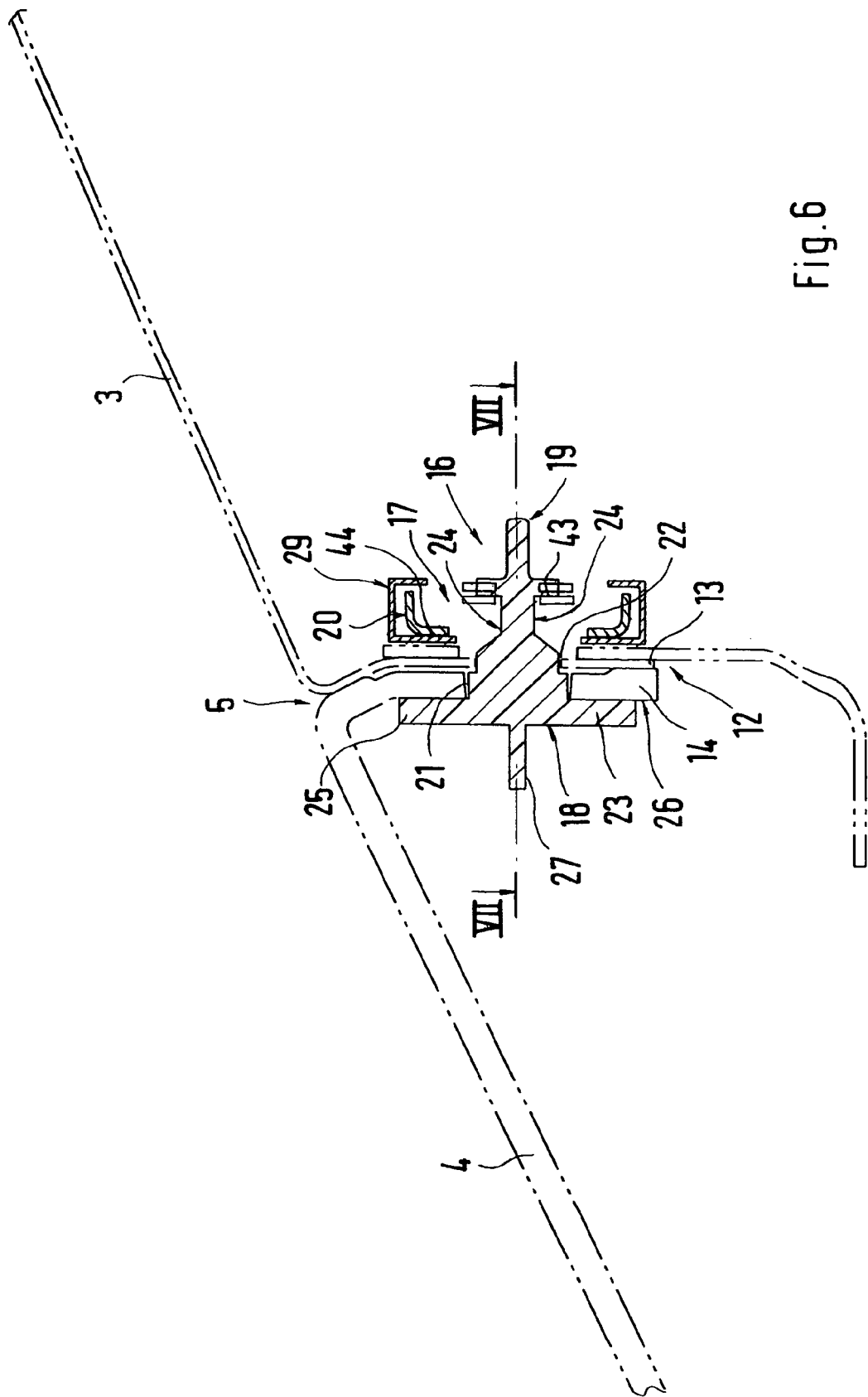
FIG. 6 is a sectional view taken along Line VI—VI of FIG. 5.

The joint 5 between the components 3, 4 extends on each longitudinal side of the vehicle between the outer edge 11 of the flap 7 and the wheel house 6, the joint 5 being divided into two separate sections by means of the inserted headlight 10. Along the joint 5, both components 3, 4 are equipped with bent-away, locally adjoining flanges 13, 14 in a common connection area 12. Flange 13 is assigned to component 3, and flange 14 is assigned to component 4. Each of the two flanges 13, 14 can be constructed in one or more layers. In the embodiment shown, flange 14 is constructed in one layer, and flange 13 is constructed in two layers (FIG. 6).

In the relatively narrow, not very accessible area 15 situated between the headlight 10 and the flap 7, a separable connection 16 is provided between the adjoining components 3, 4, which connection 16 is formed by a clamping connection 17 operative between the components 13, 14.

The clamping connection 17 between the two flanges 13, 14 comprises at least one plate-shaped fastening element 18 with at least one projecting holding section 19 and an elastic clamp 20 being in an operative connection with the fastening element 18. The at least one holding section 19 extends at least through openings 21, 22 of the two flanges 13, 14 and projects over the two flanges 13, 14, viewed in the transverse direction, by a measurement A. On the side of the fastening element 18 situated opposite a head section 23, the elastic clamp 20 can be slid from the side into detent grooves 24 of the at least one projecting holding section 19.

Figure 7:
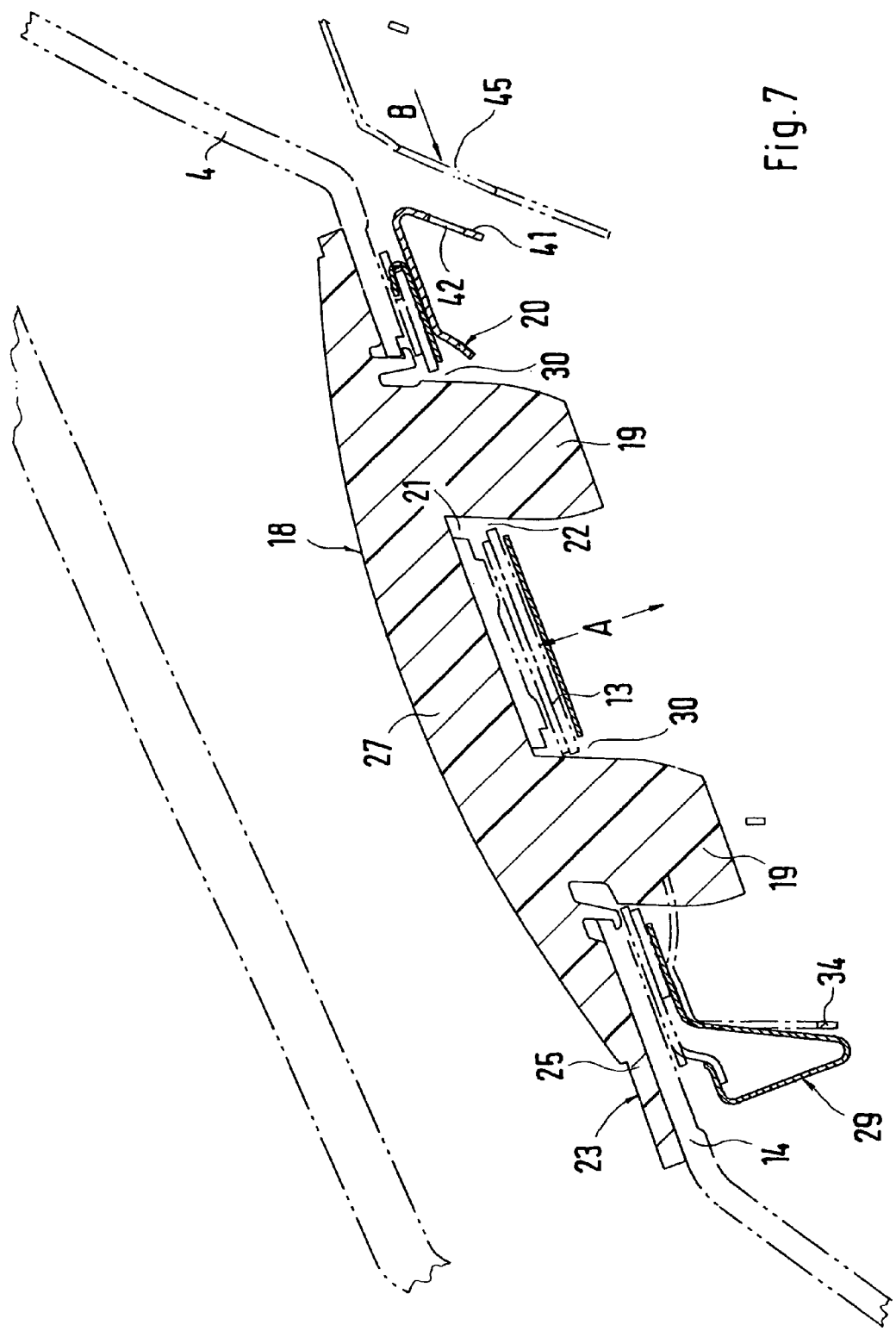
FIG. 7 is a sectional view taken along Line VII—VII of FIG. 6.

The head section 23 of the fastening element 18 is formed by an elongated base plate 25 which, viewed in the vertical direction, is relatively narrow and which extends laterally to the free contact surface 26 of the flange 14 of one of the two components, for example, 4, and is supported there. In the top view, the base plate 25 has an approximately square construction. For reinforcing the base plate 25, ribs, which locally extend longitudinally and/or transversely, may be provided on the base plate 25. FIGS. 6 and 7 illustrate a curved rib 27 extending in the longitudinal direction of the base plate 25. Preferably, two holding sections 19 arranged at a distance from one another and extend away from the head section 23 of the base plate 25, which holding sections 19 are aligned approximately at a right angle with respect to the vertical course of the flanges 13, 14. In the top view, the holding sections 19 extend either at a right angle or at an angle with respect to the longitudinal course of the flanges 13, 14. In the embodiment shown, the plate-shaped fastening element 18 is premounted on the component 4, thus on the front-end covering. However, it may also be premounted on another component. This premounting takes place by riveting, clipping-on, gluing, or the like. The holding sections 19 projecting away from the base plate 25 have a profiled, preferably non-circular cross-section. In order to ensure a defined sliding-in of the elastic clamp 20 without visual contact on all holding sections when there are several spaced holding sections 19, an elongated profiled guide rail 29 is provided on the flange 13 of the other component 3, into which guide rail 29 the elastic clamp 20 can be slid. The guide rail 29, which is preferably made of metal, has an approximately C-shaped profile and has at least one opening 30 for the guiding-through of the at least one holding section 19 of the fastening element 18.

Figure 10:
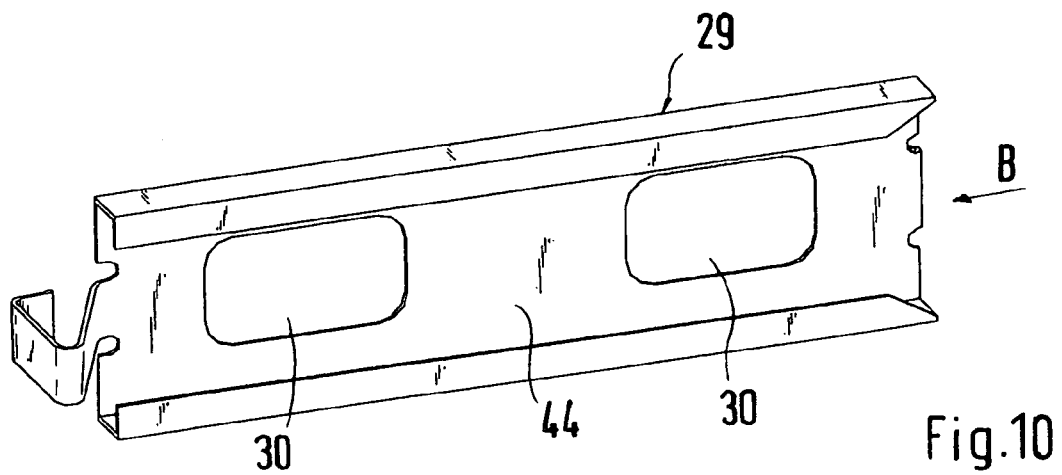
FIG. 10 is a perspective view of a guide rail for receiving the elastic clamp of the embodiment of FIGS. 1–9.

The guide rail 29 is preferably also premounted on one of the two components to be connected, for example, component 3, specifically at the respective other component at which the fastening element 18 is held in position. In the embodiment shown, the guide rail 29 is connected with the flange 13 of the component 3 by a clipping-on, by a pushing-on, by a spot-welding or the like and, at least viewed in the slide-in direction B, may have an open construction (FIG. 10).

Figure 8:
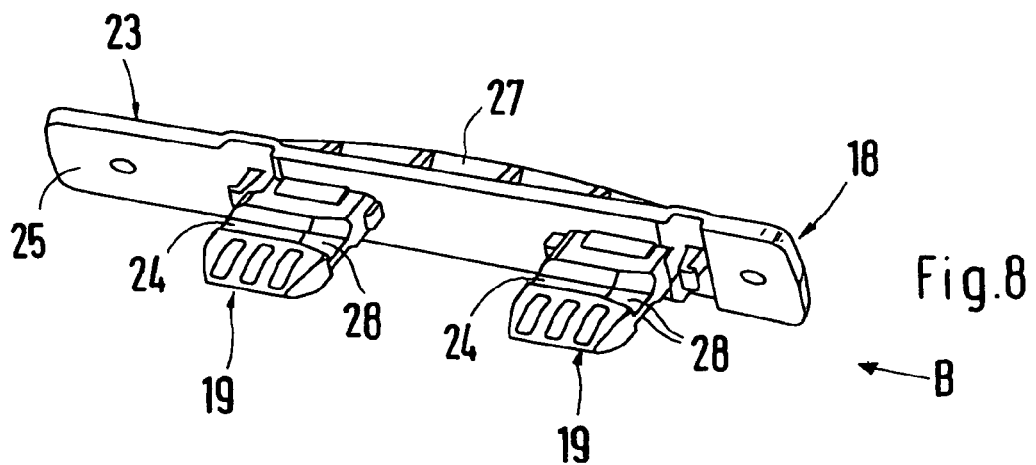
FIG. 8 is a perspective view of the plate-shaped fastening element used in the embodiment of FIGS. 1–7.
Figure 9:
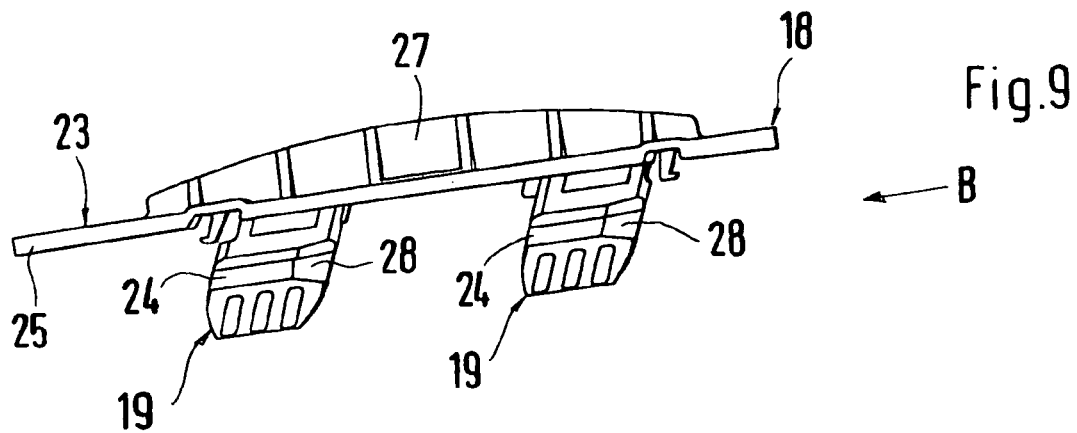
FIG. 9 is a top view of the plate-shaped fastening element of FIG. 8.

On both holding sections 19 of the fastening element 18, profiled detent grooves 24 are in each case constructed at the top side and at the bottom side, which detent grooves 24 extend approximately parallel to the base plate 25 of the flanges 13, 14 or with respect to the longitudinal course. In the top view, the detent grooves 24 may taper in the slide-in direction B or have an expanding insertion section 28 (FIGS. 8 and 9). The slide-in direction B of the elastic clamp 20 extends approximately parallel to the joint 5, specifically from the side of the flap 7, in the direction of the headlight 10. For this purpose, another flange of the fender is locally provided with a recess 45. The elastic clamp 20 comprises a dimensionally stable outer frame part 31 and an inner elastic clamp strap 32. By means of its one end 33, the clamp strap 32 is connected with the outer frame part 31. An insertion strap 34 also extends away from this connection area.

Figure 4:
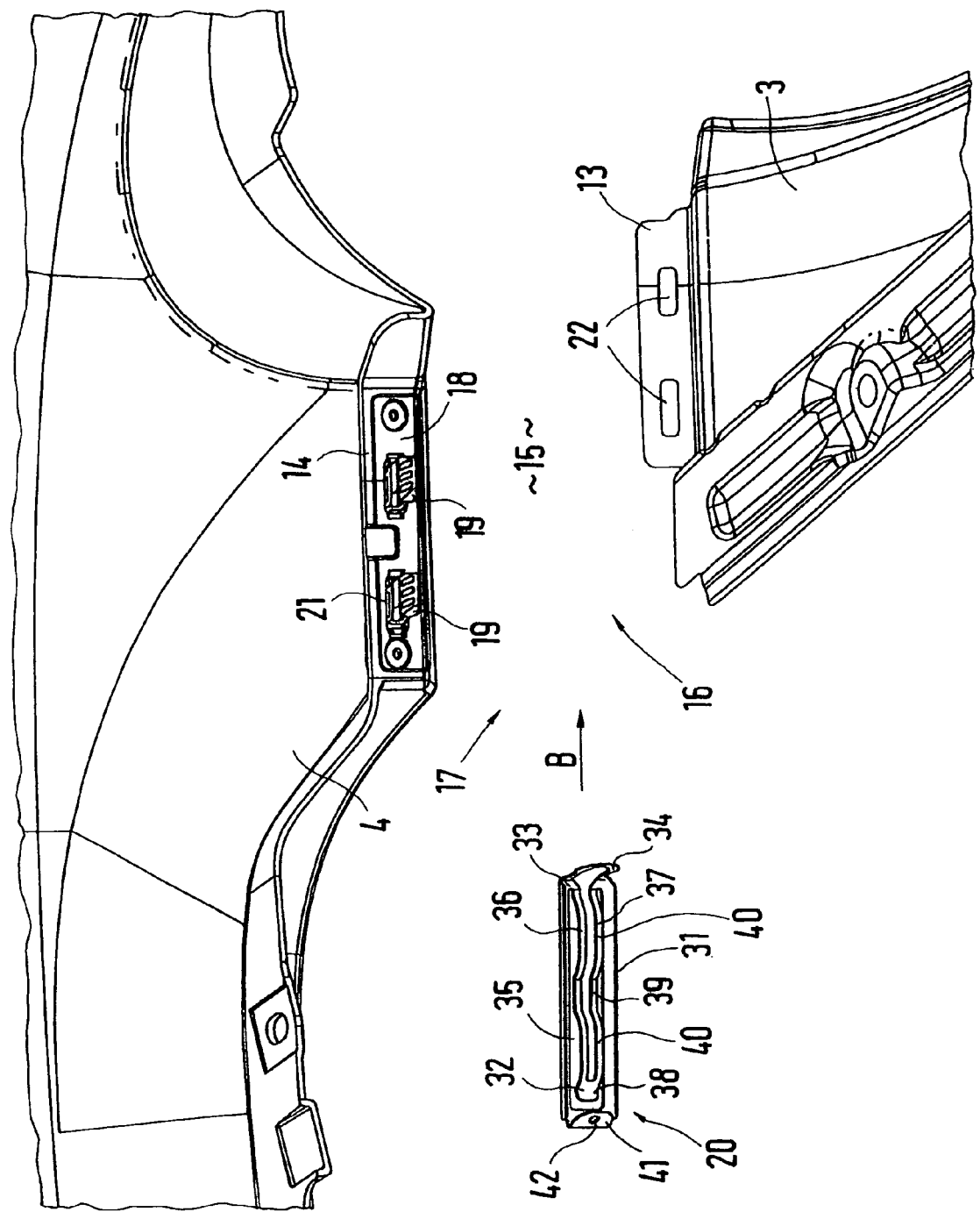
FIG. 4 is an exploded representation, viewed from the inside, of the two skin parts to be connected and a view of components of the separable connection, according to the preferred embodiment depicted in FIGS. 1–3.
Figure 5:
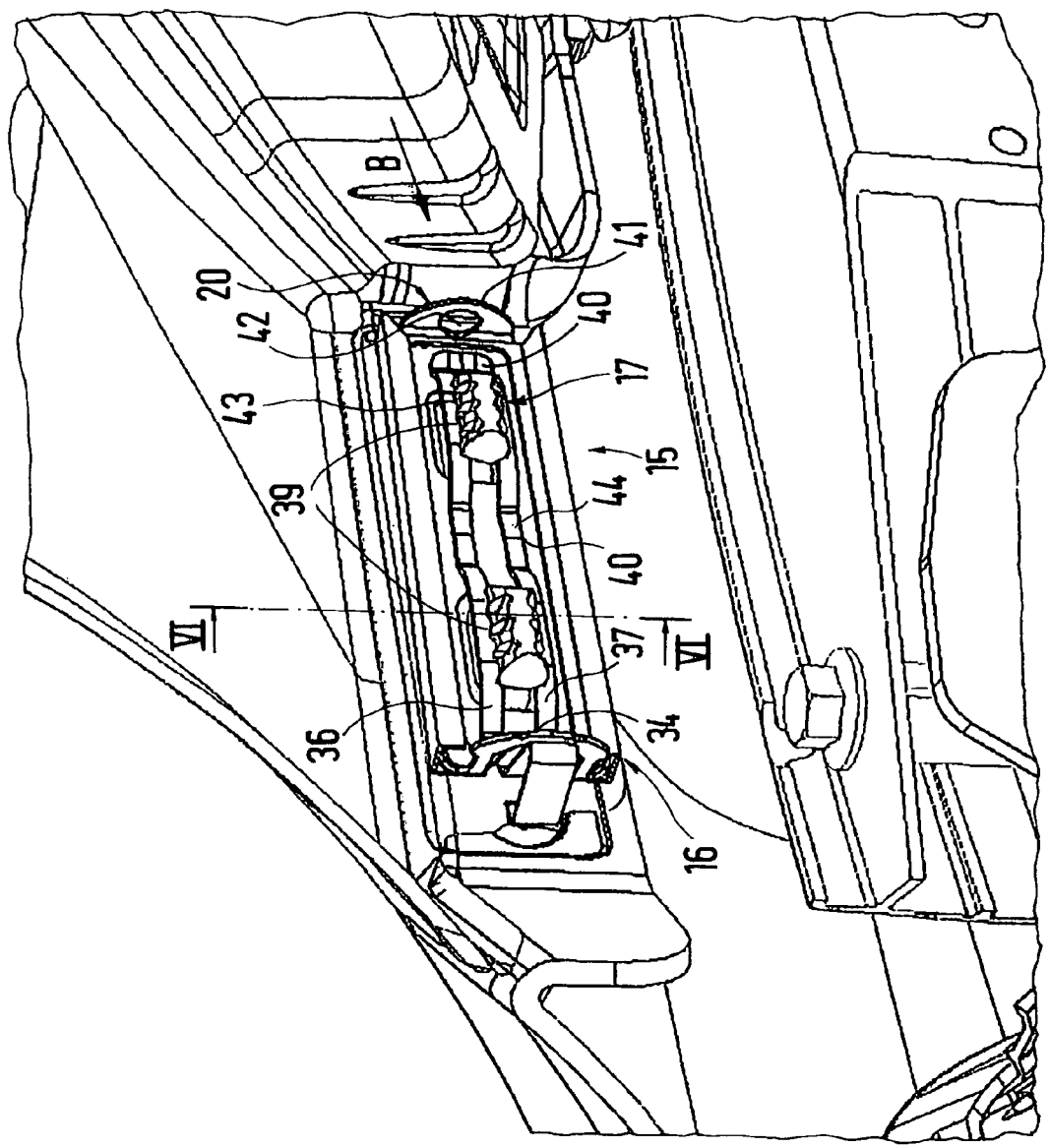
FIG. 5 is a view of the separable connection of FIGS. 1–4, shown from the inside.

A free section 35, which is U-shaped in the top view, is provided between the outer, approximately angularly profiled frame part 31 and the inner clamp strap 32. The insertion strap 34 prevents a lateral spreading-open of the clamp (FIGS. 4 and 5).

In the top view, the inner elastic clamp strap 32 has an approximately U-shaped construction and comprises two elongated mutually spaced narrow webs 36, 37 which are mutually connected at their free end by way of a transversely extending connection web 38. Bent-away supporting areas 39, 40 are constructed on the two spaced webs 36, 37 and at the transversely extending connection web 38 of the clamp strap 32, so that the clamp 20 is alternately supported on a lateral edge 43 of the detent grooves 24 and on the interior side 44 of the guide rail 29 while being prestressed. On the side of the clamp 20 facing away from the insertion strap 34, a bent-away wall section 41 is provided which has a demounting opening 42.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Separable connection between two adjoining skin components of a motor vehicle body, which are fitted to one another along a joint and, in a common connection area, are provided with bent-away, locally adjoining flanges, wherein the separable connection is formed by a clamping connection bracing the two flanges with respect to one another, which clamping connection comprises at least one plate-shaped fastening element with a slide-type elastic clamp, a head section of the plate-shaped fastening element being supported on one of the two components, and the fastening element having at least one holding section which is guided through openings of the two flanges, which fastening element projects over the two flanges, and is provided with detent grooves aligned approximately parallel to the longitudinal course of the flanges into which detent grooves the elastic clamp is inserted from the side in a slide-in direction.

2. Separable connection according to claim 1, wherein the head section of the fastening element is formed by a narrow elongated base plate which is guided laterally to a free contact surface of the flange of one of the two components and is supported there.

3. Separable connection according to claim 2, wherein the at least one holding section includes two mutually spaced holding sections which extend away from the base plate.

4. Separable connection according to claim 3, wherein the holding sections are aligned approximately at a right angle with respect to a vertical course of the flanges.

5. Separable connection according to claim 2, wherein the plate-shaped fastening element is premounted on one of the two components to be connected.

6. Separable connection according to claim 5, wherein the elongated base plate is held in position on the flange of one of the components.

7. Separable connection according to claim 6, wherein the at least one holding section includes two mutually spaced holding sections which extend away from the base plate.

8. Separable connection according to claim 7, wherein the holding sections are aligned approximately at a right angle with respect to a vertical course of the flanges.

9. Separable connection according to claim 1, wherein an oblong profiled guide rail is provided which receives the elastic clamp for facilitating a defined sliding-in of the elastic clamp at the flange.

10. Separable connection according to claim 9, wherein the guide rail has a C-shaped profile and has at least one opening for the guiding-through of the at least one holding section of the fastening element.

11. Separable connection according to claim 10, wherein the guide rail is premounted on one of the two components to be connected.

12. Separable connection according to claim 11, wherein the guide rail is premounted on a flange of one of the two components to be connected.

13. Separable connection according to claim 9, wherein the guide rail is premounted on one of the two components to be connected.

14. Separable connection according to claim 13, wherein the guide rail is premounted on a flange of one of the two components to be connected.

15. Separable connection according to claim 1, wherein the elastic clamp comprises an outer frame part and an inner elastic clamp strap, the clamp strap being connected by means of its one end with the outer frame part.

16. Separable connection according to claim 15, wherein in a top view, a U-shaped free section is provided between the outer frame part and the elastic clamping strap.

17. Separable connection according to claim 15, wherein the elastic clamp has a bent-away insertion strap adjacent to the common connection area of the frame part and the clamping strap.

18. Separable connection according to claim 17, wherein a wall section with a demounting opening is provided at the outer frame part at the end facing away from the insertion strap.

19. Separable connection according to claim 1, wherein, in a top view, the clamping strap comprises an approximately U-shaped construction and two elongated, mutually spaced narrow webs, which are mutually connected at their free end by way of a transversely extending connection web.

20. Separable connection according to claim 19, wherein the two spaced webs of the clamping strap alternately have supporting areas for the guide rail and the detent grooves.

21. A passenger vehicle body assembly comprising:
a first skin part provided with a first connecting flange,
a second skin part provided with a second connecting flange, and
a separable connection assembly operable to clamp the first and second connecting flanges together,
wherein the separable connection is formed by a clamping connection bracing the two flanges with respect to one another, which clamping connection comprises at least one plate-shaped fastening element with a slide-type elastic clamp, a head section of the plate-shaped fastening element being supported on one of the two components, and the fastening element having at least one holding section which is guided through openings of the two flanges, which fastening element projects over the two flanges, and is provided with detent grooves aligned approximately parallel to the longitudinal course of the flanges into which detent grooves the elastic clamp is inserted from the side in a slide-in direction.

22. An assembly according to claim 21, wherein the head section of the fastening element is formed by a narrow elongated base plate which is guided laterally to a free contact surface of the flange of one of the two components and is supported there.

23. An assembly according to claim 22, wherein the at least one holding section includes two mutually spaced holding sections which extend away from the base plate.

* * * * *